(12) United States Patent
Aslam

(10) Patent No.: US 10,787,077 B2
(45) Date of Patent: Sep. 29, 2020

(54) FLOATING RING POINTER ASSEMBLY

(71) Applicants: DENSO International America, Inc., Southfield, MI (US); DENSO CORPORATION, Kariya-shi, Aichi-ken (JP)

(72) Inventor: Muhammad Nabeel Aslam, Shelby Township, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 186 days.

(21) Appl. No.: 16/196,019

(22) Filed: Nov. 20, 2018

(65) Prior Publication Data

US 2020/0156473 A1 May 21, 2020

(51) Int. Cl.
*B60K 37/02* (2006.01)
*B60K 35/00* (2006.01)
*B62D 25/14* (2006.01)
*B60R 11/02* (2006.01)
*B60R 11/00* (2006.01)

(52) U.S. Cl.
CPC .............. *B60K 37/02* (2013.01); *B60K 35/00* (2013.01); *B60R 11/0235* (2013.01); *B62D 25/14* (2013.01); *B60K 2370/42* (2019.05); *B60K 2370/698* (2019.05); *B60R 2011/0005* (2013.01); *B60R 2011/0066* (2013.01)

(58) Field of Classification Search
CPC ................ B60K 37/02; B60K 2370/42; B60K 2370/698; B60R 11/0235; B60R 2011/0066; B62D 25/14
See application file for complete search history.

(56) References Cited

U.S. PATENT DOCUMENTS

| | | | | |
|---|---|---|---|---|
| 6,827,034 B1 * | 12/2004 | Paulo | ..................... | G01D 11/28 116/286 |
| 6,979,094 B1 * | 12/2005 | Venkatram | ............. | G01D 11/28 362/23.01 |
| 7,810,444 B2 * | 10/2010 | Sultan | .................... | B60K 37/02 116/288 |
| 9,036,336 B2 * | 5/2015 | Yasumoto | .............. | B60K 35/00 361/679.01 |
| 9,096,131 B2 * | 8/2015 | Nagara | .................. | B60K 37/02 |
| 9,306,442 B2 * | 4/2016 | Esposito | ............. | G01D 13/265 |

* cited by examiner

*Primary Examiner* — Faye M Fleming
(74) *Attorney, Agent, or Firm* — Harness, Dickey & Pierce, P.L.C.

(57) ABSTRACT

Systems and methods are disclosed and include an instrument cluster assembly, which includes a printed circuit board (PCB). A first motor assembly is coupled to the PCB, and the first motor assembly is configured to drive a first screw. A second motor assembly is coupled to the PCB, and the second motor assembly is configured to drive a second screw. The instrument cluster assembly includes a floating ring pointer assembly, and at least one of a position and an orientation of the floating ring pointer assembly is configured to be adjusted in response to at least one of the first motor assembly and the second motor assembly driving the first screw and the second screw, respectively. The instrument cluster assembly includes a display screen configured to generate a display based on at least one of the position and the orientation of the floating ring pointer assembly.

20 Claims, 7 Drawing Sheets

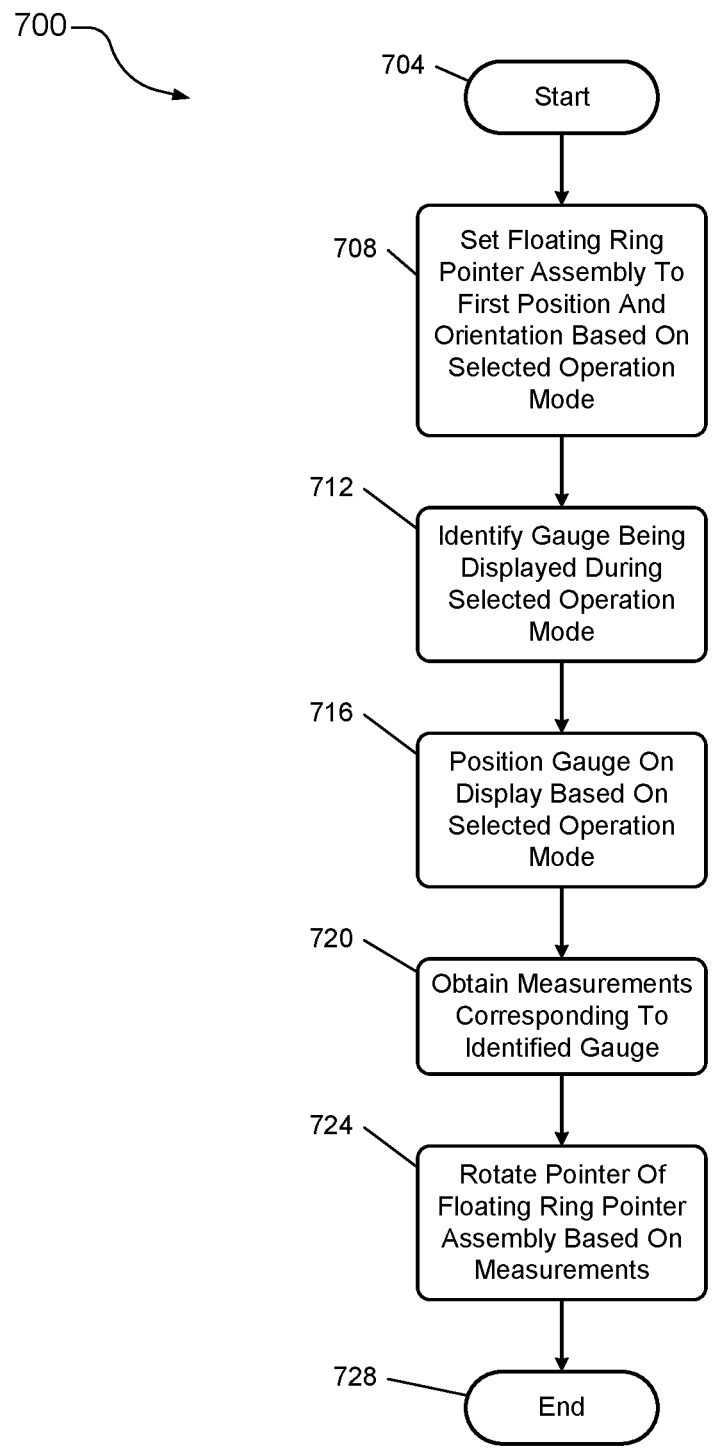

FLOATING RING POINTER ASSEMBLY

FIELD

The present disclosure relates to a floating ring pointer assembly of an instrument cluster.

BACKGROUND

This section provides background information related to the present disclosure and is not necessarily prior art.

Instrument clusters are often used with vehicles or other machinery to convey information to an operator of the vehicle or machinery. As an example, instrument clusters are often used to convey a vehicle speed, an engine speed, an engine temperature, a fuel level, an engine oil level, etc. Instrument clusters often include one or more pointer needles, which are movable to point to different portions of a meter or gauge in order to convey information to the operator. Furthermore, instrument clusters are beginning to incorporate thin-film transistor (TFT) displays in order to display the various gauges and pointer needles.

SUMMARY

This section provides a general summary of the disclosure, and is not a comprehensive disclosure of its full scope or all of its features.

The disclosure provides a system that includes an instrument cluster assembly, and the instrument cluster assembly includes a printed circuit board (PCB). A first motor assembly is coupled to the PCB, and the first motor assembly is configured to drive a first screw. A second motor assembly is coupled to the PCB, and the second motor assembly is configured to drive a second screw. The instrument cluster assembly includes a floating ring pointer assembly, and at least one of a position and an orientation of the floating ring pointer assembly is configured to be adjusted in response to at least one of the first motor assembly and the second motor assembly driving the first screw and the second screw, respectively. The instrument cluster assembly includes a display screen located below the floating ring pointer assembly, and the display screen is configured to generate a display based on at least one of the position and the orientation of the floating ring pointer assembly.

In some embodiments, the first motor assembly is configured to drive the first screw in response to receiving a signal from an electronic control unit, wherein the electronic control unit includes at least one processor that is configured to execute instructions stored in a nontransitory medium; and the second motor assembly is configured to drive the second screw in response to receiving the signal from the electronic control unit.

In some embodiments, the floating ring pointer assembly is configured to move laterally in response to the first motor assembly driving the first screw in a first direction and the second motor assembly driving the second screw in the first direction.

In some embodiments, the floating ring pointer assembly is configured to rotate in response to the first motor assembly driving the first screw in a first direction and the second motor assembly driving the second screw in a second direction.

In some embodiments, the floating ring pointer assembly is configured to rotate in response to at least one of a change of an operation mode of a vehicle and receiving measurements representing operating characteristics of the vehicle.

In some embodiments, the floating ring pointer assembly is configured to move laterally and rotate in response to the first motor assembly driving the first screw in a first direction and the second motor assembly not driving the second screw.

In some embodiments, the at least one of the position and orientation of the floating ring pointer assembly is based on an operation mode of a vehicle.

In some embodiments, the first screw and the second screw are worm screws.

In some embodiments, the first screw is coupled to the PCB using a first PCB mount; and the second screw is coupled to the PCB using a second PCB mount.

In some embodiments, the first PCB mount includes a first opening that is configured to receive the first screw; the first screw is configured to rotate within the first opening; the second PCB mount includes a second opening that is configured to receive the second screw; and the second screw is configured to rotate within the second opening.

In some embodiments, the first screw is threadably engaged with a first portion of the floating ring pointer assembly; and the second screw is threadably engaged with a second portion of the floating ring pointer assembly.

A method is disclosed and includes setting, using at least one of a first motor assembly and a second motor assembly and in response to receiving a signal from an electronic control unit, a position and an orientation of a floating ring pointer assembly to a first position and a first orientation, wherein the first position and the first orientation are associated with a default operation mode of a vehicle, and wherein the electronic control unit includes at least one processor that is configured to execute instructions stored in a nontransitory memory. The method also includes adjusting, using at least one of the first motor assembly and the second motor assembly and in response to at least one of the first motor assembly and the second motor assembly receiving a second signal, at least one of the position and the orientation of the floating ring pointer assembly, wherein the second signal is generated in response to the electronic control unit receiving an input corresponding to an operation mode change of the vehicle.

In some embodiments, in response to the second signal indicating that the operation mode change corresponds to the floating ring pointer assembly moving laterally, the method further comprises: driving, using the first motor assembly, a first screw in a first direction; and driving, using the second motor assembly, a second screw in the first direction.

In some embodiments, in response to the second signal indicating that the operation mode change corresponds to the floating ring pointer assembly rotating, the method further comprises: driving, using the first motor assembly, a first screw in a first direction; and driving, using the second motor assembly, a second screw in a second direction.

In some embodiments, in response to the second signal indicating that the operation mode change corresponds to the floating ring pointer assembly rotating and moving laterally, the method further comprises: driving, using the first motor assembly, a first screw in a first direction; and refraining, using the second motor assembly, from driving a second screw.

In some embodiments, the method further comprises adjusting a display based on the first position and the first orientation.

In some embodiments, the method further comprises adjusting a display based on the operation mode change of the vehicle.

Another method is disclosed and includes setting, using at least one of a first motor assembly and a second motor assembly and in response to receiving a signal from an electronic control unit, a position and an orientation of a floating ring pointer assembly to a first position and a first orientation, wherein the first position and the first orientation are associated with an operation mode of a vehicle, and wherein the electronic control unit includes at least one processor that is configured to execute instructions stored in a nontransitory memory. The method also includes rotating, using at least one of the first motor assembly and the second motor assembly and in response to at least one of the first motor assembly and the second motor assembly receiving a second signal, a pointer of a floating ring pointer assembly by a first amount, wherein: the second signal is generated in response to receiving a measurement from at least one sensor; the measurement indicates an operating characteristic of the vehicle; and the first amount is based on a value of the measurement.

In some embodiments, the method rotating the pointer of the floating ring pointer assembly further comprises: driving, using the first motor assembly, a first screw in a first direction; and driving, using the second motor assembly, a second screw in a second direction.

In some embodiments, the first amount indicates at least one of a speed of the vehicle and an acceleration of the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7 is a flowchart of another example control algorithm according to the present disclosure.

Corresponding reference numerals indicate corresponding parts throughout the several views of the drawings.

DETAILED DESCRIPTION

Example embodiments will now be described more fully with reference to the accompanying drawings.

Figure 1:
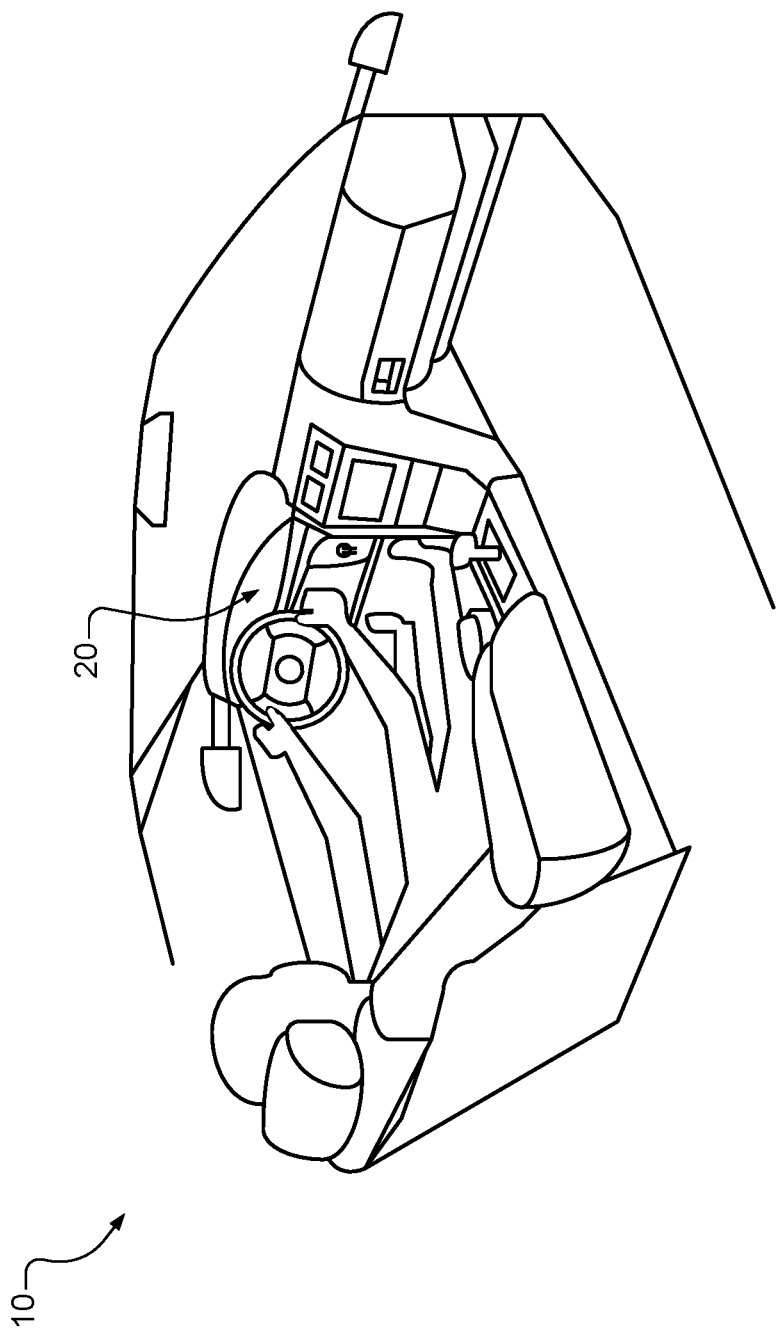
FIG. 1 illustrates an example instrument cluster assembly of a vehicle according to the present disclosure.

With reference to FIG. 1, an illustration of an instrument cluster assembly 20 of a vehicle 10 is shown. The instrument cluster assembly 20 is configured to provide various information and metrics of the vehicle 10 to an operator, such as a vehicle speed, an engine speed, an engine temperature, a fuel level, an engine oil level, etc.

Figure 2:
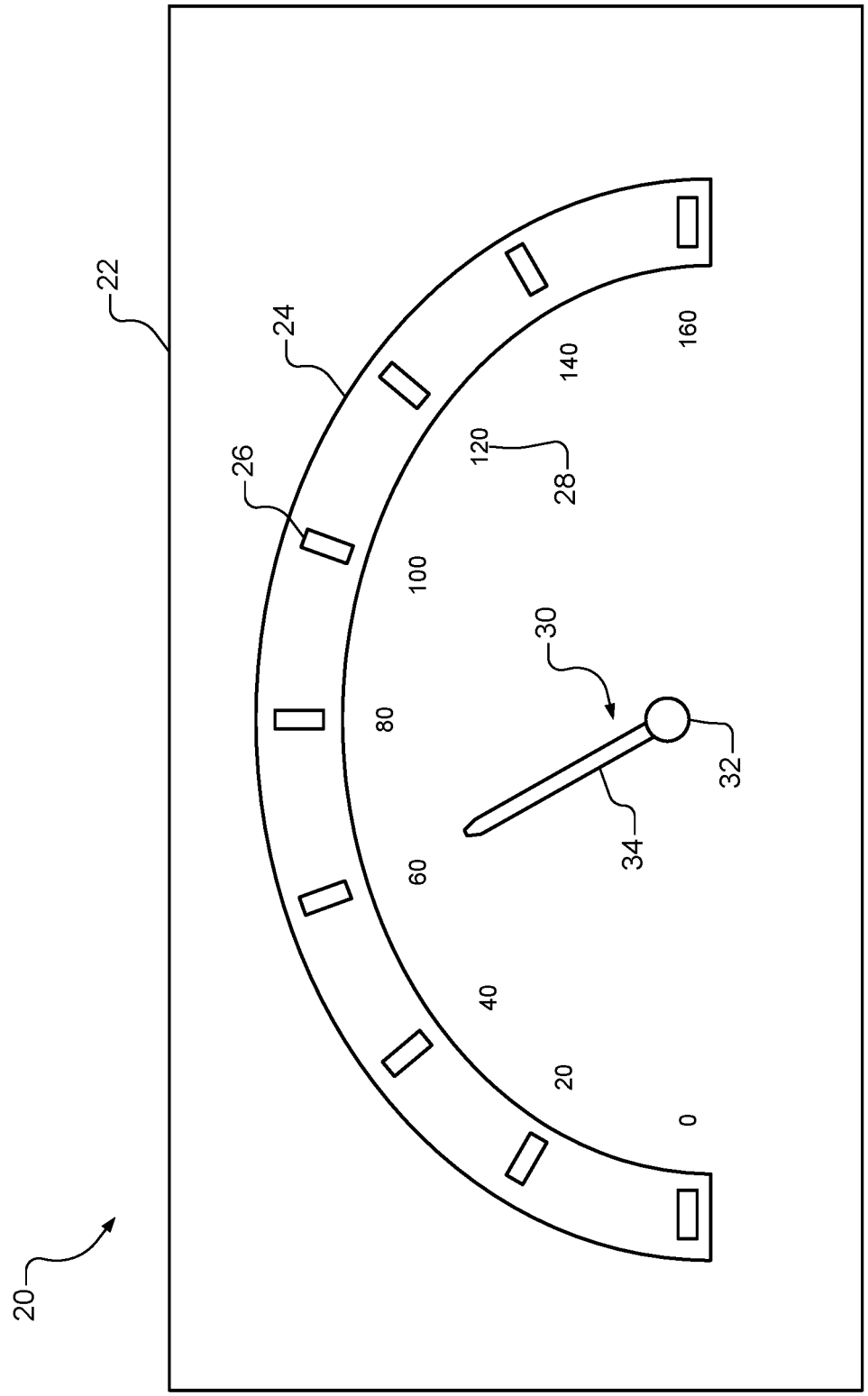
FIG. 2 illustrates an example instrument cluster assembly according to the present disclosure.

With reference to FIG. 2, a detailed illustration of the instrument cluster assembly 20 is shown. The instrument cluster assembly 20 may include a display 22, a gauge 24, and a pointer 30. The display 22 may be any suitable type of electronic display screen, such as a TFT display. The gauge 24 includes a plurality of tick marks or accents 26, which are spaced apart about the gauge 24 and aligned with numerals 28. In some embodiments, there may be more (or less) tick marks 26 than numerals 28. In other embodiments, there may be no numerals 28 and only tick marks 26. The pointer 30 may be rotatably movable to point to any one of tick marks 26 and numerals 28 or any other portion of the gauge 24.

The gauge 24 is configured to provide any suitable type of information to the operator of the vehicle 10. As an example, the gauge 24 may be implemented by one of a speedometer, an engine speed gauge, a fuel level gauge, an engine temperature gauge, an engine oil level gauge, etc. The numerals 28 may be printed on the instrument cluster assembly 20 in any suitable manner or be displayed by the display 22. When the display 22 displays the numerals 28, the display 22 can readily change the numerals 28 in order change the type of gauge 20 displayed. For example, the operator can change the gauge 20 from a speedometer to a tachometer based on the operator's preference.

The pointer 30 may include a hub 32 and a needle 34 extending from the hub 32. In one embodiment, the pointer 30 may be implemented by a graphic of the display 22. In other embodiments, the hub 32 is rotatable by a post, which extends from and is rotated by a motor. Moreover, the post may extend through an opening defined in the display 22 and supports the hub 32 over the display 22. Example pointer assemblies are described in detail in U.S. Pub. No. 2017/0219392, filed Jan. 29, 2016 and assigned to DENSO International America, Inc. and DENSO Corporation, which is incorporated herein by reference in its entirety.

Figure 3:
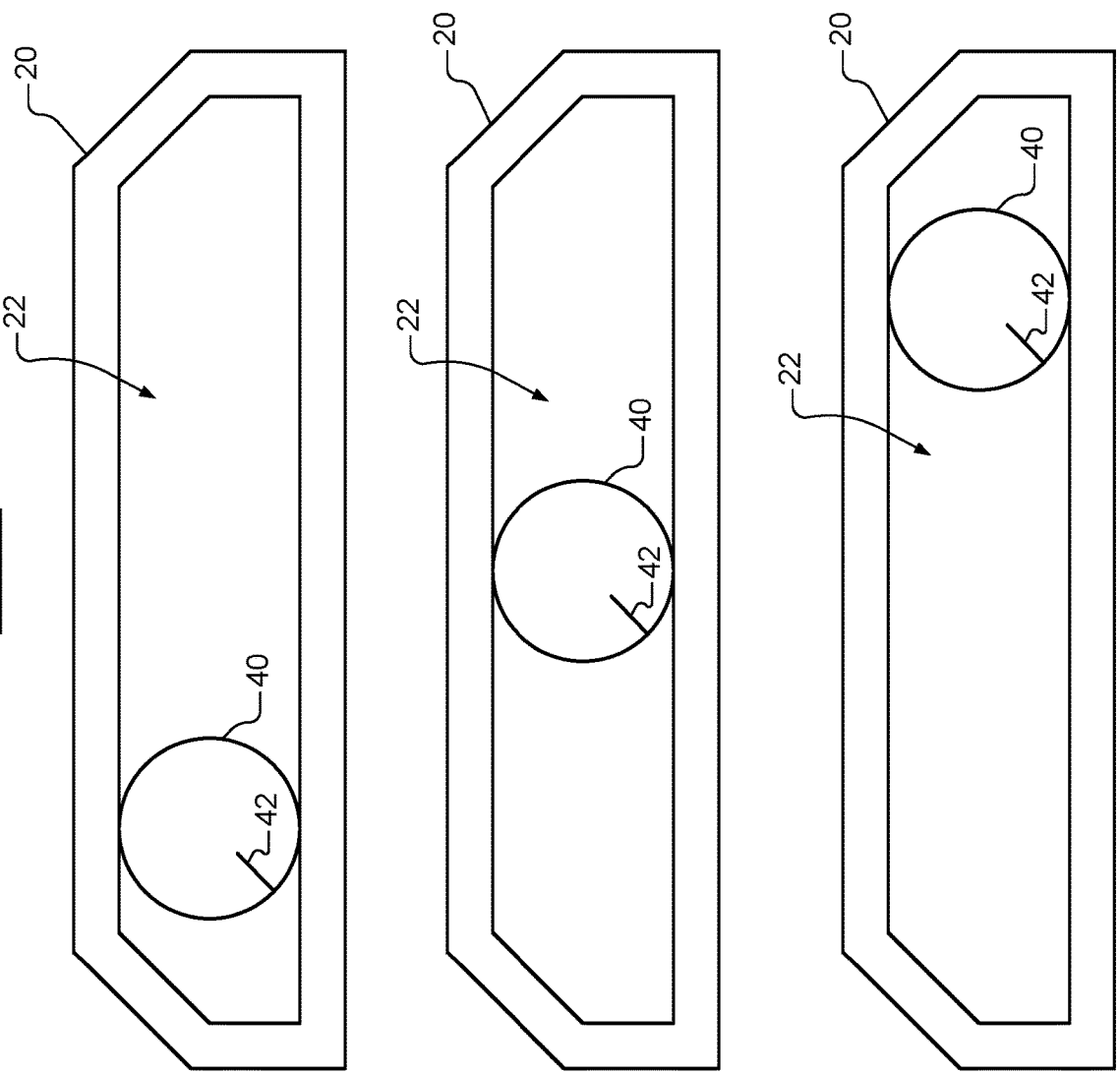
FIG. 3 illustrates an example floating ring pointer assembly of an instrument cluster assembly according to the present disclosure.

With reference to FIG. 3, an example illustration of a floating ring pointer assembly 40 located within the instrument cluster assembly 20 is shown. The floating ring pointer assembly 40 includes a pointer 42, and the floating ring pointer assembly 40 is disposed above the display 22. As described below in further detail with reference to FIGS. 4-6, an electronic control unit (discussed in further detail below) is configured to set a position and/or orientation of the floating ring pointer assembly 40 within the instrument cluster assembly 20 based on an operation mode of the vehicle 10.

In response to the electronic control unit setting the position and/or orientation of the floating ring pointer assembly 40, the display 22 subsequently provides any suitable type of information to the operator of the vehicle 10 using the gauge. As an example, the gauge may be implemented by one of a speedometer, an engine speed gauge, a fuel level gauge, an engine temperature gauge, an engine oil level gauge, etc. Furthermore, a location of the gauge on the display 22 is based on the position and/or orientation of the floating ring pointer assembly 40. As an example, the floating ring pointer assembly 40 may be disposed above the display 22 at a first location and have a first orientation within the instrument cluster assembly 20. Accordingly, the gauge may be displayed such that the gauge is located within an area associated with the first location and corresponds with the first orientation.

Furthermore, the pointer 42 is configured to rotate in response to an adjustment of the orientation of the floating ring pointer assembly 40. As an example, if the gauge is a speedometer, the electronic control unit may receive measurements from a variety of sensors that represent a speed of the vehicle 10. Based on the measurements, the electronic control module may adjust the orientation of the floating ring pointer assembly 40 such that the position of the pointer 42 is rotated to a location that is indicative of the vehicle speed. Specifically, if the measurements indicate the vehicle 10 is traveling at, for example, 45 mph, the pointer 42 may be rotated to a location that corresponds with a tick mark and/or numeral on the display 22 that indicates the vehicle 10 is traveling at 45 mph. An algorithm for rotating the pointer 42 is described below in further detail with reference to FIG. 7.

Figure 4:
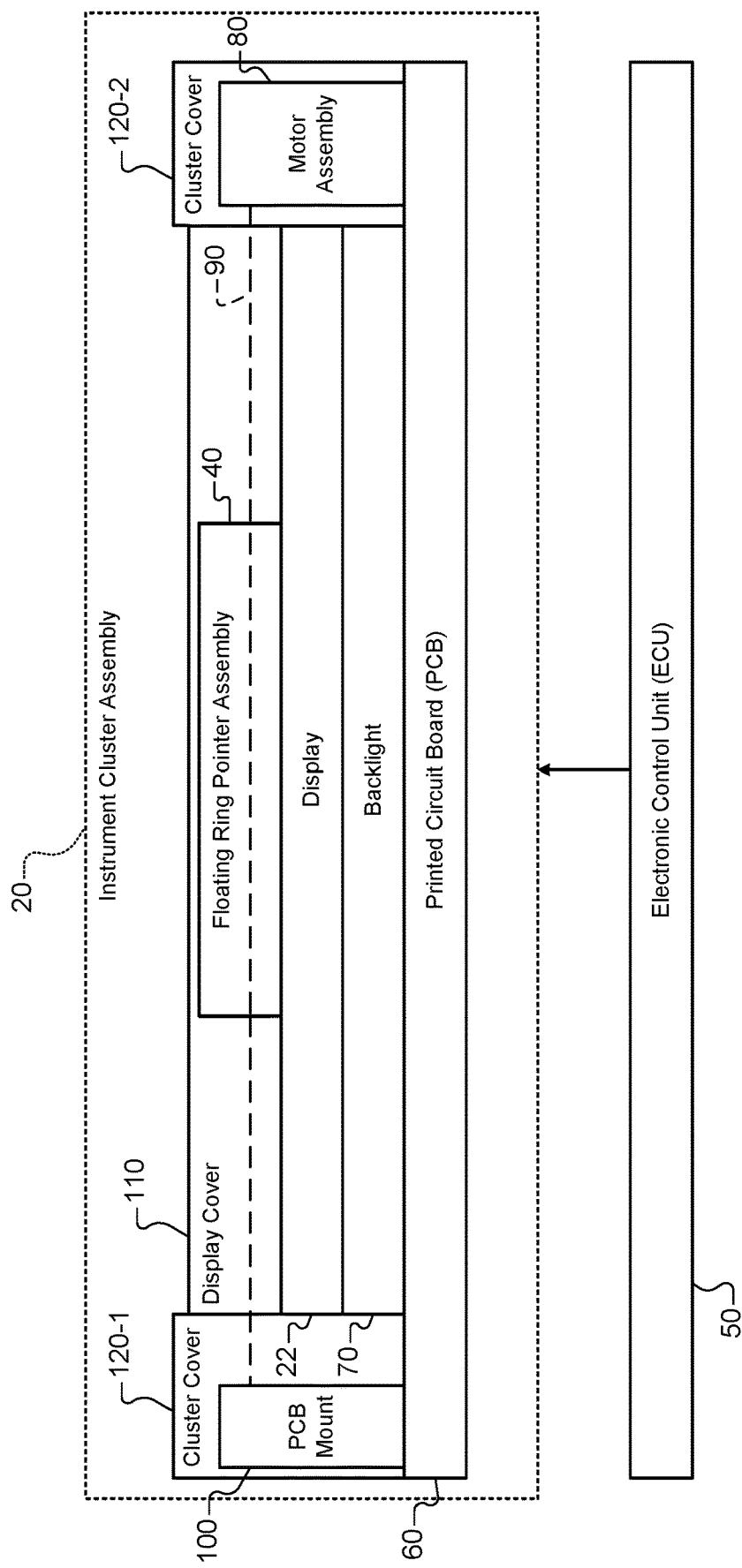
FIG. 4 is a functional block diagram of the instrument cluster assembly and an electronic control unit according to the present disclosure.

With reference to FIG. 4, an example block diagram of the instrument cluster assembly 20 and an electronic control unit (ECU) 50 are shown. In one embodiment, the instrument cluster assembly 20 includes the display 22, the floating ring pointer assembly 40, a printed circuit board (PCB) 60, a backlight 70, a motor assembly 80, a screw 90, a PCB mount 100, a display cover 110, and cluster covers 120-1, 120-2 (collectively referred to as cluster cover 120). While FIG. 4 illustrates one motor assembly 80, one screw 90, and one PCB mount 100, the instrument cluster assembly 20 may include multiple motor assemblies 80, screws 90, and PCB mounts 100, as described below in further detail with reference to FIG. 5.

The PCB 60 is configured to electrically couple the ECU 50 to the backlight 70, display 22, floating ring pointer assembly 40, and motor assembly 80. Accordingly, the backlight 70, display 22, floating ring pointer assembly 40, and the motor assembly 80 may be activated in response to receiving signals from the ECU 50, which may include one or more processors that are configured to execute instructions stored in a nontransitory memory, such as a random-access memory (RAM) and/or a read-only memory (ROM). As an example, the ECU 50 may generate a signal corresponding to a desired operation mode of the vehicle 10, and the signal activates the motor assembly 80 and subsequently drives the screw 90. As described below in further detail, driving the screw 90 adjusts the position and/or orientation of the floating ring pointer assembly 40. As another example, the signal corresponding to the desired operation mode of the vehicle 10 may activate the backlight 70 and control images, text, and/or graphics displayed on the display 22.

Additionally, the PCB 60 is configured to mechanically support the backlight 70, display 22, floating ring pointer assembly 40, motor assembly 80, PCB mount 100, and cluster cover 120. As an example, the PCB mount 100, the backlight, and the motor assembly 80 are physically coupled to the PCB 60. Additionally, the cluster cover 120 may be physically coupled to the PCB 60. In other embodiments, the display cover 110 and/or the cluster cover 120 may mechanically support the floating ring pointer assembly 40.

The backlight 70 is configured to provide light to the display 22. In one embodiment, the backlight 70 may include an LED backlight in order to optimize energy consumption, improve contrast and brightness, and employ a greater color range. The PCB mount 100 may include an opening that is configured to receive the screw 90. As described below in further detail with reference to FIG. 5, in response to the ECU 50 driving the motor assembly 80, the screw 90 is configured to rotate within the opening of the PCB mount 100. The display cover 110 may be a transparent, protective cover that is positioned above floating ring pointer assembly 40 and display 22. The cluster cover 120 may be a protective cover that is positioned over the PCB 60, the motor assembly 80, and the PCB mount 100.

Figure 5:
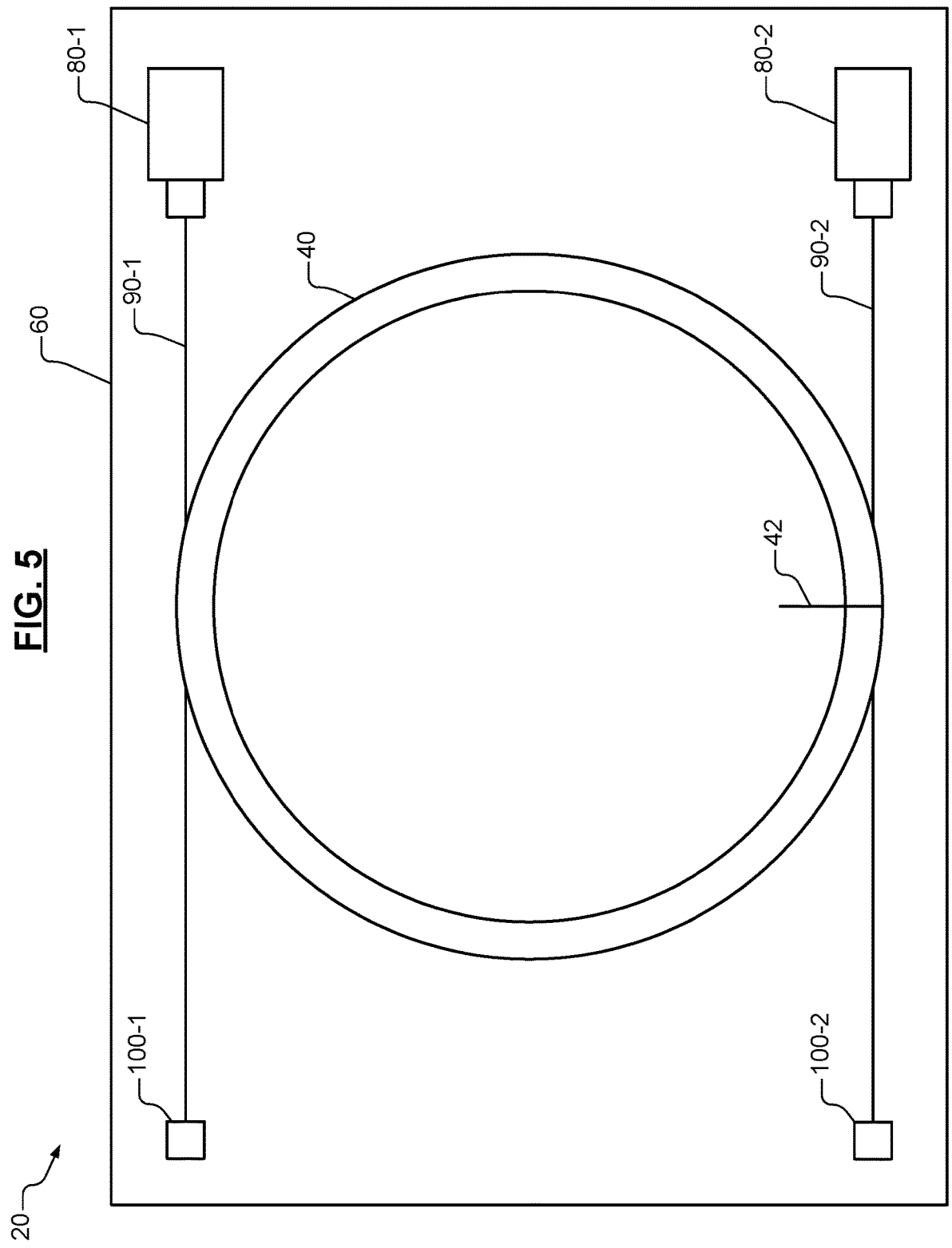
FIG. 5 is a top-view illustration of the floating ring pointer assembly and a printed circuit board according to the present disclosure.

With reference to FIG. 5, a top-view illustration of the floating ring pointer assembly 40 and the PCB 60 is shown. As described above, the instrument cluster assembly 20 may include multiple motor assemblies 80, screws 90, and PCB mounts 100. As a specific example, this embodiment includes a first motor assembly 80-1 and a second motor assembly 80-2 (collectively referred to as motor assemblies 80), a first screw 90-1 and a second screw 90-2 (collectively referred to as screws 90), and a first PCB mount 100-1 and a second PCB mount 100-2 (collectively referred to as PCB mounts 100).

In one embodiment, the motor assemblies 80 may be implemented by a worm gear motor, and the screws 90 may be implemented by a threaded worm screw. As such, when the motor assemblies 80 are activated by the signal received from the ECU 50, the screws 90 are configured to rotate within the openings of the respective PCB mounts 100.

The screws 90 are physically coupled to a respective portion of the floating ring pointer assembly 40. As an example, the screws 90 may threadably engage each of the respective portions of the floating ring pointer assembly 40. As such, when the motor assemblies 80 drive the screws 90, the position and/or orientation of the floating ring pointer assembly 40 may be adjusted within the instrument cluster assembly 20.

Furthermore, in order to adjust the position and/or orientation of the floating ring pointer assembly 40, the ECU 50 may generate a signal that causes the floating ring pointer assembly 40 to rotate and/or move laterally within the instrument cluster assembly 20. As an example, in order to rotate the floating ring pointer assembly 40, the ECU 50 may generate a signal that instructs the motor assemblies 80 to drive the corresponding screws 90 in opposite directions. As a specific example, the ECU 50 may generate a signal that instructs (i) the first motor assembly 80-1 to drive the first screw 90-1 in a first direction (e.g., clockwise) and (ii) the second motor assembly 80-2 to drive the second screw 90-2 in a second direction (e.g., counterclockwise). Alternatively, the ECU 50 may generate a signal that instructs (i) the first motor assembly 80-1 to drive the first screw 90-1 in the second direction and (ii) the second motor assembly 80-2 to drive the second screw 90-2 in the first direction.

In order to move the floating ring pointer assembly 40 laterally within the instrument cluster assembly 20, the ECU 50 may generate a signal that instructs each of the motor assemblies 80 to drive the corresponding screws 90 in a same direction. As a specific example, the ECU 50 may generate a signal that instructs (i) the first motor assembly 80-1 to drive the first screw 90-1 in the first direction and (ii) the second motor assembly 80-2 to drive the second screw 90-2 in the first direction. Alternatively, the ECU 50 may generate a signal that instructs (i) the first motor assembly 80-1 to drive the first screw 90-1 in the second direction and (ii) the second motor assembly 80-2 to drive the second screw 90-2 in the second direction.

In order to rotate and move the floating ring pointer assembly 40 laterally within the instrument cluster assembly 20, the ECU 50 may generate a signal that instructs only one of the motor assemblies 80 to drive the corresponding screws 90 in a direction associated with the desired position. As an example, the ECU 50 may generate a signal that instructs only the first motor assembly 80-1 to drive the first screw 90-1 in the first or second direction. Alternatively, the ECU 50 may generate a signal that instructs only the second motor assembly 80-2 to drive the second screw 90-2 in the first or second direction.

As described above, the position and/or orientation of the floating ring pointer assembly 40 may be based on an operation mode of the vehicle 10. As described herein, the operation mode of the vehicle 10 may be defined as the vehicle's operating characteristics, such as a steering weight, engine settings, gearbox settings, and suspension settings. As an example, in a comfort mode, the ECU 50 may instruct (i) a suspension control module (not shown) to soften the suspension of the vehicle 10, and (ii) a transmission control module (not shown) to initialize gear changes prior to a default gear change time value in order to decrease an engine speed. As another example, in a sport mode, the ECU 50 may (i) instruct the suspension control module to stiffen the suspension of the vehicle 10, (ii) instruct the transmission control module to initialize gear changes later than a default gear change time value in order to increase an engine speed, and (iii) adjust a throttle control module (not shown) to increase its responsiveness to a depression of an accelerator pedal. As another example, in an economy (eco) mode, the ECU 50 may generate signals that alter the vehicle's operating characteristics in a manner that optimizes fuel efficiency. As another example, in a normal mode, the ECU 50 may generate signals that set the vehicle's operating characteristics to its default settings. As another example, in a custom mode, the ECU 50 may generate signals that set the vehicle's operating characteristics based on operator-defined settings.

For each operation mode of the vehicle 10, the floating ring pointer assembly 40 may have a unique position and/or orientation within the instrument cluster assembly 20. Accordingly, in response to the ECU 50 detecting that the operation mode of the vehicle 10 has changed, the ECU 50 is configured to generate a signal that causes the floating ring pointer assembly 40 to rotate and/or move laterally within the instrument cluster assembly 20. As an example, in the normal mode, the floating ring pointer assembly 40 may have a first position and a first orientation; and in the sport mode, the floating ring pointer assembly 40 may have a second position and a second orientation. As such, in response from an input indicating the operator desires to change the operation mode of the vehicle 10 from the normal mode to the sport mode, the ECU 50 may generate a signal causing the floating ring pointer assembly 40 to move laterally from the first position to the second position and rotate from the first orientation to the second orientation. Furthermore, the position of the gauge on the display 22 is changed such that the gauge is located within an area associated with the second location and is aligned such that it corresponds with the second orientation.

Once the position and orientation of the floating ring pointer assembly 40 is set, the ECU 50 is configured to generate a signal that rotates the floating ring pointer assembly 40 and the pointer 42 based on measurements obtained from various vehicle sensors. As an example, if the gauge is a speedometer, the ECU 50 may receive measurements from a variety of sensors that represent a speed of the vehicle 10. In response to receiving the measurements, the ECU 50 may generate a signal that instructs (i) the first motor assembly 80-1 to drive the first screw 90-1 in a first direction at a first speed (e.g., 2000 RPM) and (ii) the second motor assembly 80-2 to drive the second screw 90-2 in a second direction at a second speed (e.g., 3000 RPM). The speeds at which the motor assemblies 80 are rotated may be based on an acceleration and/or velocity of the vehicle 10 and, in some embodiments, the first speed and second speed may be equal.

As such, the floating ring pointer assembly 40 and the pointer 42 are rotatable at variable speeds in either direction based on the speed and/or acceleration of the vehicle 10. As an example, if the measurements indicate the vehicle 10 is traveling at 60 mph, the ECU 50 may activate the motor assemblies 80 to drive the respective screws 90 in a certain direction and at a certain speed in order to rotate the pointer 42 to a location that corresponds with a tick mark and/or numeral on the display 22 that indicates the vehicle 10 is traveling at 60 mph.

Figure 6:
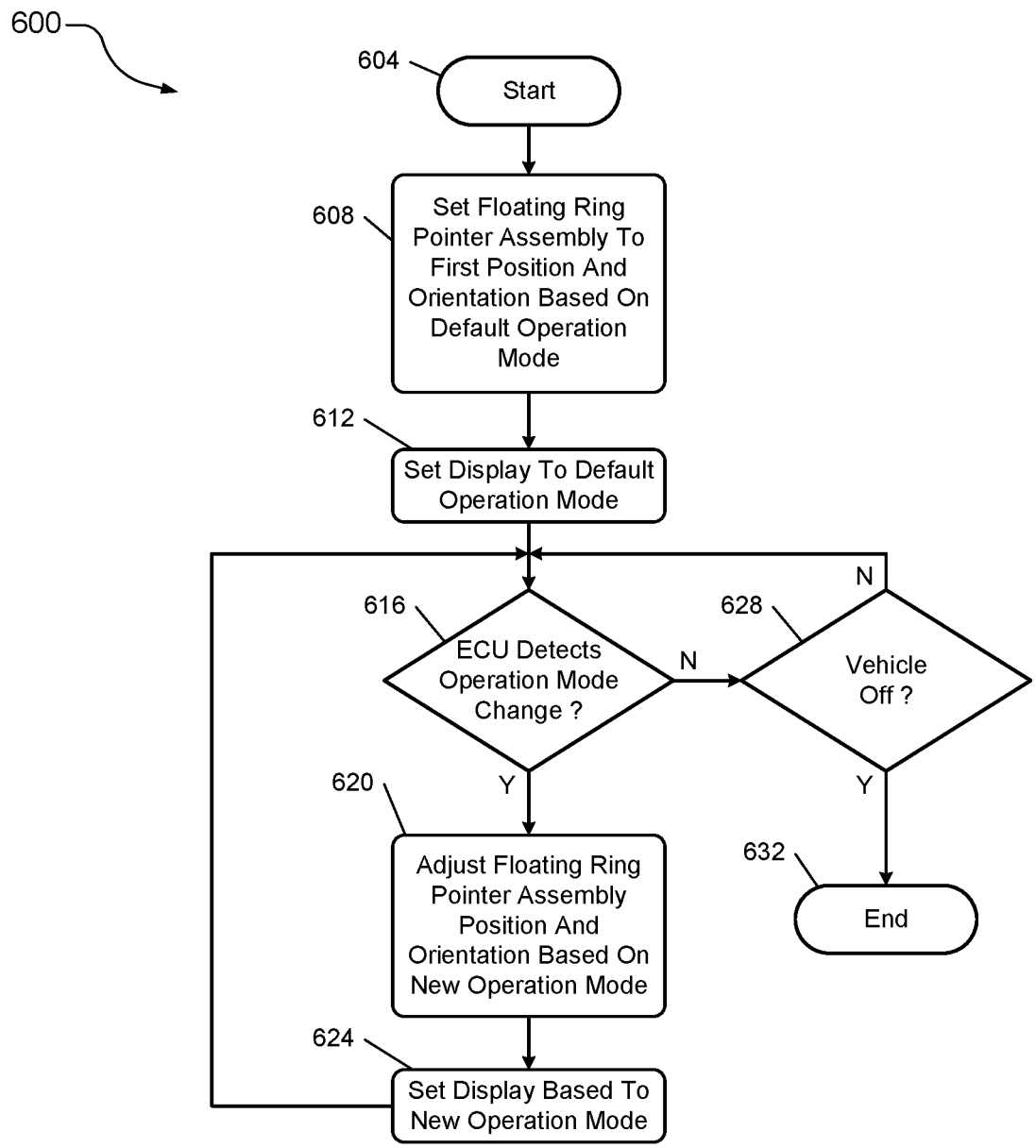
FIG. 6 is a flowchart of an example control algorithm according to the present disclosure.

With reference to FIG. 6, a flowchart illustrating a control algorithm 600 for adjusting the position and/or orientation of the floating ring pointer assembly 40 based on the operation mode of the vehicle 10 is shown. The control algorithm 600 begins at 604 when, for example, the vehicle 10 is turned on. At 608, the control algorithm 600 sets, in response to a command from the ECU 50, the floating ring pointer assembly 40 to a first position and orientation based on a default operation mode of the vehicle. As an example, if the default operation mode of the vehicle 10 is a normal mode, the position and orientation of the floating ring pointer assembly 40 is set to a position and orientation based on information stored in a lookup table corresponding to the normal mode. At 612, the control algorithm 600 sets, in response to a command from the ECU 50, the display 22 to the default mode. In other words, the graphics of the various gauges and corresponding tick marks of the display 22 are displayed such that they align and correspond with the position and orientation of the floating ring pointer assembly 40.

At 616, the control algorithm 600 detects, using the ECU 50, whether an operation mode of the vehicle 10 is changed. As an example, the operator of the vehicle 10 may generate an input, using an interface in communication with the ECU 50, corresponding to a change from the normal operation mode to the sport operation mode. In response to the ECU 50 detecting the operation mode change, the control algorithm 600 proceeds to 620; otherwise, the control algorithm 600 proceeds to 628. At 620, the control algorithm 600 adjusts, in response to a command from the ECU 50, the position and orientation of the floating ring pointer assembly 40 based on the new operation mode. As described above, the ECU 50 may activate at least one of the first motor assembly 80-1 and the second motor assembly 80-2, which causes the floating ring pointer assembly 40 to move laterally and/or rotate. At 624, the control algorithm 600 sets, in response to a command from the ECU 50, the display 22 to the new mode and proceeds to 616.

At 628, the control algorithm 600 determines, using the ECU 50, whether the vehicle 10 is off. If so, the control algorithm 600 proceeds to 632 and ends; otherwise, the control algorithm 600 proceeds to 616.

With reference to FIG. 7, a flowchart illustrating a control algorithm 700 for rotating the pointer 42 to correspond with a certain location on a gauge of the display 22 is shown. The control algorithm 700 begins at 704 when, for example, the vehicle 10 is turned on. At 708, the control algorithm 700, using the ECU 50, sets the floating ring pointer assembly 40 to a first position and a first orientation based on the selected operation mode of the vehicle 10, as described above in FIG. 6. At 712, the control algorithm 700 identifies, using the ECU 50, the type of gauge that is displayed during the selected operation mode of the vehicle 10. As an example, the selected gauge may be a speedometer. In other embodiments, the gauge may be implemented by an engine speed gauge, a fuel level gauge, an engine temperature gauge, an engine oil level gauge, or other similar gauge.

At 716, the control algorithm 700 positions the gauge on the display 22 based on the selected operation mode of the vehicle 10. As an example, the gauge may be displayed such that the gauge is located on the display 22 within an area associated with a location and orientation of the floating ring pointer assembly 40. At 720, the control algorithm 700 obtains, using the ECU 50, measurements corresponding to the identified gauge (e.g., measurements indicating a speed of the vehicle 10). At 724, the control algorithm 700 rotates, using the ECU 50, motor assemblies 80, and screws 90, the pointer 42 based on the measurements and then ends at 728.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An instrument cluster assembly comprising:
   a printed circuit board (PCB);
   a first motor assembly coupled to the PCB, wherein the first motor assembly is configured to drive a first screw;
   a second motor assembly coupled to the PCB, wherein the second motor assembly is configured to drive a second screw;
   a floating ring pointer assembly, wherein at least one of a position and an orientation of the floating ring pointer assembly is configured to be adjusted in response to at least one of the first motor assembly and the second motor assembly driving the first screw and the second screw, respectively; and
   a display screen located below the floating ring pointer assembly, wherein the display screen is configured to generate a display based on at least one of the position and the orientation of the floating ring pointer assembly.

2. The instrument cluster assembly of claim 1, wherein:
   the first motor assembly is configured to drive the first screw in response to receiving a signal from an electronic control unit, wherein the electronic control unit includes at least one processor that is configured to execute instructions stored in a nontransitory medium; and
   the second motor assembly is configured to drive the second screw in response to receiving the signal from the electronic control unit.

3. The instrument cluster assembly of claim 1, wherein the floating ring pointer assembly is configured to move laterally in response to the first motor assembly driving the first screw in a first direction and the second motor assembly driving the second screw in the first direction.

4. The instrument cluster assembly of claim 1, wherein the floating ring pointer assembly is configured to rotate in response to the first motor assembly driving the first screw in a first direction and the second motor assembly driving the second screw in a second direction.

5. The instrument cluster assembly of claim 4, wherein the floating ring pointer assembly is configured to rotate in response to at least one of a change of an operation mode of a vehicle and receiving measurements representing operating characteristics of the vehicle.

6. The instrument cluster assembly of claim 1, wherein the floating ring pointer assembly is configured to move laterally and rotate in response to the first motor assembly driving the first screw in a first direction and the second motor assembly not driving the second screw.

7. The instrument cluster assembly of claim 1, wherein the at least one of the position and orientation of the floating ring pointer assembly is based on an operation mode of a vehicle.

8. The instrument cluster assembly of claim 1, wherein the first screw and the second screw are worm screws.

9. The instrument cluster assembly of claim 1, wherein:
   the first screw is coupled to the PCB using a first PCB mount; and
   the second screw is coupled to the PCB using a second PCB mount.

10. The instrument cluster assembly of claim 9, wherein:
    the first PCB mount includes a first opening that is configured to receive the first screw;
    the first screw is configured to rotate within the first opening;
    the second PCB mount includes a second opening that is configured to receive the second screw; and
    the second screw is configured to rotate within the second opening.

11. The instrument cluster assembly of claim 1, wherein:
    the first screw is threadably engaged with a first portion of the floating ring pointer assembly; and
    the second screw is threadably engaged with a second portion of the floating ring pointer assembly.

12. A method comprising:
    setting, using at least one of a first motor assembly and a second motor assembly and in response to receiving a signal from an electronic control unit, a position and an orientation of a floating ring pointer assembly to a first position and a first orientation, wherein:
       the first position and the first orientation are associated with a default operation mode of a vehicle; and
       the electronic control unit includes at least one processor that is configured to execute instructions stored in a nontransitory memory; and
    adjusting, using at least one of the first motor assembly and the second motor assembly and in response to at least one of the first motor assembly and the second motor assembly receiving a second signal, at least one of the position and the orientation of the floating ring pointer assembly, wherein the second signal is generated in response to the electronic control unit receiving an input corresponding to an operation mode change of the vehicle.

13. The method of claim 12, wherein in response to the second signal indicating that the operation mode change corresponds to the floating ring pointer assembly moving laterally, the method further comprises:
    driving, using the first motor assembly, a first screw in a first direction; and
    driving, using the second motor assembly, a second screw in the first direction.

14. The method of claim 12, wherein in response to the second signal indicating that the operation mode change corresponds to the floating ring pointer assembly rotating, the method further comprises:
   driving, using the first motor assembly, a first screw in a first direction; and
   driving, using the second motor assembly, a second screw in a second direction.

15. The method of claim 12, wherein in response to the second signal indicating that the operation mode change corresponds to the floating ring pointer assembly rotating and moving laterally, the method further comprises:
   driving, using the first motor assembly, a first screw in a first direction; and
   refraining, using the second motor assembly, from driving a second screw.

16. The method of claim 12, further comprising adjusting a display based on the first position and the first orientation.

17. The method of claim 12 further comprising adjusting a display based on the operation mode change of the vehicle.

18. A method comprising:
   setting, using at least one of a first motor assembly and a second motor assembly and in response to receiving a signal from an electronic control unit, a position and an orientation of a floating ring pointer assembly to a first position and a first orientation, wherein:
      the first position and the first orientation are associated with an operation mode of a vehicle; and
      the electronic control unit includes at least one processor that is configured to execute instructions stored in a nontransitory memory; and
   rotating, using at least one of the first motor assembly and the second motor assembly and in response to at least one of the first motor assembly and the second motor assembly receiving a second signal, a pointer of a floating ring pointer assembly by a first amount, wherein:
      the second signal is generated in response to receiving a measurement from at least one sensor;
      the measurement indicates an operating characteristic of the vehicle; and
      the first amount is based on a value of the measurement.

19. The method of claim 18, wherein rotating the pointer of the floating ring pointer assembly further comprises:
   driving, using the first motor assembly, a first screw in a first direction; and
   driving, using the second motor assembly, a second screw in a second direction.

20. The method of claim 18, wherein the first amount indicates at least one of a speed of the vehicle and an acceleration of the vehicle.

* * * * *